Feb. 6, 1940.  J. A. HANSEN  2,189,713
HANDLING TOOL
Filed May 1, 1939
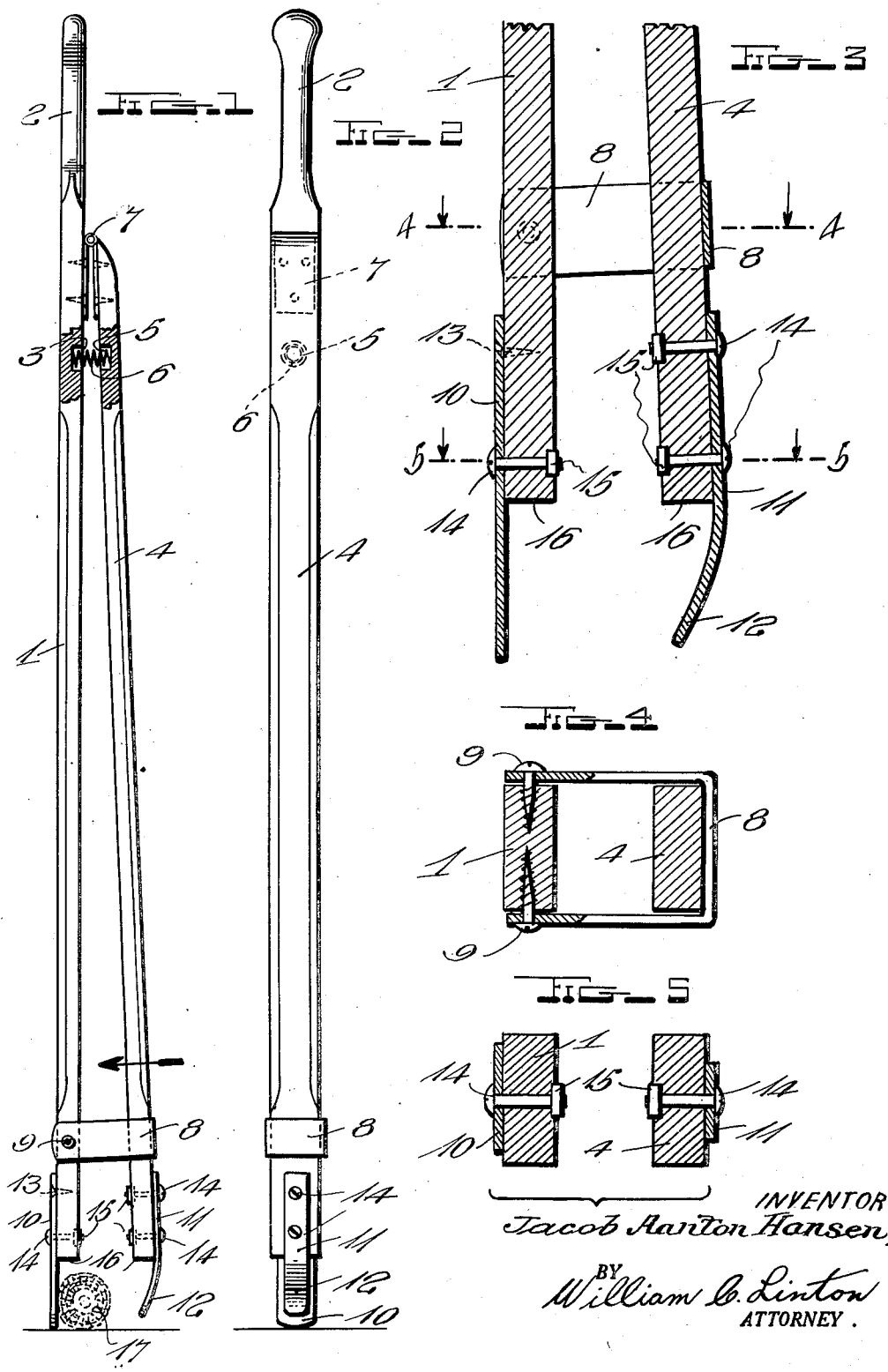
INVENTOR
Jacob Aanton Hansen,
BY William C. Linton
ATTORNEY.

Patented Feb. 6, 1940

2,189,713

UNITED STATES PATENT OFFICE 2,189,713

HANDLING TOOL

Jacob Anton Hansen, Hampton, Iowa

Application May 1, 1939, Serial No. 271,216

2 Claims. (Cl. 294—19)

The present invention relates to hand tools for handling cylindrically shaped objects and refers more especially to hand tools for assisting in picking ears of corn from stalks or from the ground.

In corn fields wherein mechanical pickers are used for removing ears of corn from the stalks thereof, considerable corn is left upon the ground or broken ears are left upon the corn stalks and in order to facilitate the recovery of the missed ears of corn with dexterity and speed, the present invention was conceived.

The principal object of the present invention is to provide an economically produced hand device for handling ears of corn.

Another important object of the present invention is to provide a hand tool which is simple to operate and yet which permits the user thereof to easily and quickly handle ears of corn for placing the same within a container therefor.

Another and equally important object of the present invention is to provide a tool which permits the user thereof to pick ears of corn from the ground or from corn stalks with ease, while remaining in a normal standing position.

Further objects of the present invention will be in part pointed out and in part obvious from the following detailed description based upon the accompanying drawing.

In the drawing:

Fig. 1 is a side elevation of the device comprising the present invention with a portion thereof in cross section and being shown with an ear of corn lying upon a surface between the holding members thereof.

Fig. 2 is a front view of the device shown in Fig. 1.

Fig. 3 is an enlarged detail side cross sectional view of the lower portion of the tool.

Fig. 4 is a top detail view taken on line 4—4 of Fig. 3 and shows the pivotal mounting of a retaining member forming part of the invention, and Fig. 5 is a top cross sectional view taken on line 5—5 of Fig. 3 and shows a constructional detail of the present tool.

Referring now more particularly to the accompanying drawing wherein like parts are designated by similar reference characters, numeral 1 designates a shaft having a handle 2 formed at the upper end thereof. One face of shaft 1 has attached thereto by screws one leaf of a hinge 7. The other leaf of said hinge 7 is screwed to one face of the upper end portion of an arm 4. Both shaft 1 and arm 4 have recesses 3 and 5 respectively formed in the faces thereof to which the leaves of hinge 7 are connected. Said recesses 3 and 5 are diametrically opposed and each has an end of a coil spring 6 positioned therein.

The opposite or lower end of shaft 1 has a substantially U-shaped band 8 pivotally connected to the sides thereof. As best shown in Figs. 3 and 4, each end of band 8 is pivotally connected to a side of shaft 1 by means of screws 9 passing through openings formed in band 8 to within said shaft 1. Band 8 is mounted upon the smooth portion or shank of screws 9 and can therefore readily pivot about these axes. Arm 4 extends through band 8 and is retained thereby relative to shaft 1.

The lower end portion of shaft 1 has a straight jaw 10 connected to the outer face thereof by screws 13, bolts 14 and nuts 15. Similarly, arm 4 has a jaw 11 mounted upon the outer face thereof by bolts 14 and nuts 15. However, jaw 11 has a curved portion 12 which extends inwardly towards jaw 10. The lower edges 16 of shaft 1 and arm 4 are thereby positioned between the jaws 10 and 11.

An operator of the present device grasps handle 2 in one hand and encases the portions of shaft 1 and arm 4 in the other hand. By placing jaw 10 upon the ground alongside an ear of corn 17, the encasing hand draws arm 4 towards shaft 1, thereby compressing spring 6 and, at the same time, forcing curved portion 12 of jaw 11 against the ear of corn. Jaw 11, being curved at portion 12, has a scooping action relative to the ear of corn and causes the same to be lifted upwardly and placed against the lower edges 16 of shaft 1 and arm 4, thereby retaining the same between the jaws 10 and 11 and edges 16. If the ear of corn still remains upon the corn stalk, the jaws 10 and 11 cooperating with lower edges 16 will readily and firmly grip the ear, whereby, due to the leverage of the shaft 1 and arm 4, the ear of corn can be easily and readily removed from the corn stalk.

Whenever the tool is not gripping an object, spring 6 causes the shaft 1 and arm 4 to pivot upon hinge 7 away from one another and this expanding action is arrested however by band 8, which prevents arm 4 from moving more than a given desired distance from shaft 1.

The present tool may have the members thereof formed from any material and said members may be of any desired length but, however, any modifications to the device shown and described herein which come within the scope of the appended claims is deemed to be part of the present invention.

I claim:

1. An improvement in tools for handling cylindrical objects comprising a shaft, an arm pivotally connected to said shaft with an end of each adjacent one another, means tending to pivot said arm from said shaft a limited distance, a straight plate extending longitudinally from the end of said shaft adjacent said arm end and carried by a face of said shaft away from said arm, and a curved plate extending longitudinally from the end of said arm adjacent said shaft end and carried extending towards said straight plate by a face of said arm away from said shaft.

2. An improvement in tools for handling cylindrical objects comprising a shaft, an arm pivotally connected at one end to said shaft with the free end of said arm being positioned adjacent an end of said shaft, means tending to pivot said arm from said shaft a limited distance, a straight plate carried by said adjacent end of said shaft, a curved plate carried by said free end of said arm and extending towards said straight plate, and said adjacent ends forming stops for an object held between said plates.

JACOB ANTON HANSEN.